(12) United States Patent  (10) Patent No.: US 7,351,152 B2
Abe et al.  (45) Date of Patent: Apr. 1, 2008

(54) HAND-HELD GAME APPARATUS, GAME PROGRAM STORAGE MEDIUM AND GAME CONTROL METHOD FOR CONTROLLING DISPLAY OF AN IMAGE BASED ON DETECTED ANGULAR VELOCITY

(75) Inventors: Goro Abe, Kyoto (JP); Kazuyoshi Osawa, Kyoto (JP)

(73) Assignee: Nintendo Co., Ltd., Kyoto-shi (JP)

( * ) Notice: Subject to any disclaimer, the term of this patent is extended or adjusted under 35 U.S.C. 154(b) by 45 days.

(21) Appl. No.: 11/154,603

(22) Filed: Jun. 17, 2005

(65) Prior Publication Data

US 2006/0046848 A1    Mar. 2, 2006

(30) Foreign Application Priority Data

Aug. 31, 2004 (JP) .............................. 2004-251231

(51) Int. Cl.
*A63F 13/00* (2006.01)
(52) U.S. Cl. ...................................................... 463/43
(58) Field of Classification Search ............ 463/30–32, 463/34, 36–38, 43–44
See application file for complete search history.

(56) References Cited

U.S. PATENT DOCUMENTS

| 4,527,155 | A | * | 7/1985 | Yamaki et al. .............. 345/657 |
| 4,969,647 | A | | 11/1990 | Mical et al. |
| 5,898,421 | A | | 4/1999 | Quinn |
| 6,375,572 | B1 | * | 4/2002 | Masuyama et al. ............ 463/43 |
| 6,556,185 | B2 | * | 4/2003 | Rekimoto .................... 345/157 |
| 2003/0216176 | A1 | | 11/2003 | Shimizu et al. |
| 2004/0029640 | A1 | | 2/2004 | Masuyama et al. |
| 2004/0164958 | A1 | * | 8/2004 | Park ........................... 345/158 |

FOREIGN PATENT DOCUMENTS

| JP | 07-261727 | 10/1995 |
| JP | 09-044143 | 2/1997 |
| JP | 10-049290 | 2/1998 |
| JP | 10-240434 | 9/1998 |

(Continued)

OTHER PUBLICATIONS

European Search Report issued in corresponding EP Application No. 05105501.0 on Sep. 6, 2007.

*Primary Examiner*—Kim Nguyen
(74) *Attorney, Agent, or Firm*—Nixon & Vanderhye P.C.

(57) ABSTRACT

A game apparatus includes a hand-held housing, a display screen, and a gyro sensor for detecting an angular velocity of a rotation around an axis perpendicular to the display screen. When the player rotates the game apparatus around the axis, a rotation angle of the housing is calculated based on the detected angular velocity. The display screen displays a game image including a rotational image rotated according to the rotation angle and an irrotational image controlled independently of the rotation angle. The rotational image is controlled so as to rotate in a direction opposite to the rotation angle and by the same degree of angle as the rotation angle, for example. It thus appears to the player that the rotational image stands still and the irrotational image makes a rotational movement. The progress of the game is changed according to a result of the determination.

4 Claims, 11 Drawing Sheets

FOREIGN PATENT DOCUMENTS

| | | |
|---|---|---|
| JP | 11-99284 | 4/1999 |
| JP | 2000-325653 | 11/2000 |
| JP | 2001-125555 | 5/2001 |
| JP | 2001-170358 | 6/2001 |
| JP | 2001-265309 | 9/2001 |
| JP | 2003-62341 | 3/2003 |

* cited by examiner (A)

(B)

(A)

(B)

(A)

(B)

(A)

(B)

HAND-HELD GAME APPARATUS, GAME PROGRAM STORAGE MEDIUM AND GAME CONTROL METHOD FOR CONTROLLING DISPLAY OF AN IMAGE BASED ON DETECTED ANGULAR VELOCITY

BACKGROUND OF THE INVENTION

1. Field of the Technology

The present technology described herein relates to a game apparatus, storage medium storing a game program, and game control method. More specifically, the present invention relates to a game apparatus comprising a housing of a size capable of being held by a player and a display means including a display screen provided in the housing and on which a game is advanced by the player who rotates the housing around an axis perpendicular to the display screen, a storage medium storing a game program used for the game apparatus, and a game control method.

2. Description of the Prior Art

Typical hand-held game machines and game consoles of conventional types are configured for a player to play a game by performing game operations through manipulation of buttons and joystick. Meanwhile, there are also some special game apparatuses on which a game is played by moving the housing itself of a game machine equipped with a display screen or the housing itself of an operating controller.

For example, a document 1 (Japanese Patent Laying-open No. 2001-170358) discloses a related art for detecting the tilt of a hand-held game machine's housing and applying the detected tilt to a game. More specifically, this document proposes a game in which the amount and direction of movement of a character vary depending on the amount and direction of tilt of the housing. Additionally, a document 2 (Japanese Patent Laying-open No. 2003-62341) discloses a related art for detecting the tilt of a hand-held game machine's housing and applying the detected tilt to a so-called "block-dropping" puzzle game. That is, this document proposes a puzzle game apparatus in which puzzle elements are moved in the direction of the tilt.

Moreover, a document 3 (Japanese Patent Laying-open No. H11-99284) discloses a controller with a built-in angular velocity sensor. This controller detects the angular velocity of rotation of the housing around an X axis, Y axis and Z axis, that is, it detects rolling, pitching and yawing of the housing, and then issues operational instructions by its own movement as in the case of using operating buttons.

The game apparatus in the document 1 or document 2 realizes a game with a new sense of operation, which is advanced by tilting the housing of the game machine. However, giving a tilt to the game machine itself would cause the display screen to deviate from a state of being right opposite to the player. Thus, this apparatus has the drawback of making a game screen hard to see, which may spoil the fun of game playing.

Meanwhile, the controller described in the document 3 makes it possible to make a game progress by tilting or rotating the controller itself. However, the controller cannot be operated in a manner integrated with the game screen, which does not make it possible to provide a new way of enjoying a game except that another operation is added to normal button and joystick operations.

Besides, even a combination of the related arts in the documents 1 to 3 could offer just a game in which, when yawing has been detected, for example, a character or puzzle element is merely moved in the direction of the yawing.

SUMMARY OF PRESENT NON-LIMITING, EXEMPLARY EMBODIMENTS

Therefore, it is one aspect of the present non-limiting, exemplary embodiments to provide a novel game apparatus, storage medium storing a game program, and game control method.

It is another aspect of the present non-limiting, exemplary embodiments to provide a game apparatus, storage medium storing a game program used for the apparatus, and game control method, which make it possible to play a new game by performing an operation of rotating the game apparatus itself including a display screen around an axis perpendicular to the display screen.

It is still another aspect of the present non-limiting, exemplary embodiments to provide a game apparatus, storage medium storing a game program, and game control method, which make it possible to enjoy playing a game by performing an operation of moving the game apparatus itself but without making the screen hard to see.

It is further another aspect of the present non-limiting, exemplary embodiments to provide a game apparatus, storage medium storing a game program, and game control method, which make it possible to play a new sense of game with highly entertaining characteristics, the game being advanced in accordance with a relationship between an image rotating based on the rotating angle of the game apparatus and an image independent of the rotating angle of the same.

A game apparatus according to the present non-limiting, exemplary embodiments is a game apparatus equipped with a housing of a size capable of being held by the player with hands and a display means including a display screen provided in the housing. This game apparatus comprises an angular velocity detection means, a rotation angle calculation means, a first image data storage means, a second image data storage means, a first image display control means, a second image display control means, a determination means, and a game progress change means. The angular velocity detection means detects an angular velocity of a rotation around an axis perpendicular to the display screen. The rotation angle calculation means calculates a rotation angle of the housing based on the angular velocity detected by the angular velocity detection means. The first image data storage means stores data for displaying on the display means at least one first image of which rotation and display are controlled according to the rotation angle. The second image data storage means stores data for displaying on the display means at least one second image of which display is controlled independently of the rotation angle. The first image display control means displays on the display means the first image at least in a rotated state, based on the rotation angle. The second image display control means controls display of the second image independently of the rotation angle. The determination means determines whether or not at least one of a display angle and a display position of the first image controlled by the first image display control means satisfies a requirement defined by a relationship with display of the second image. The game progress change means makes a change in the progress of a game according to a result of the determination by the determination means.

More specifically, a game apparatus (10: a reference numeral corresponding to the preferred embodiments described later. The same is applied to the following numerals.) is equipped with a housing (16) of a size capable of being held by a player with hands. The housing is provided with a display screen of a display means (18). That is, the game apparatus is a compact and lightweight game apparatus that can be held at both ends by the player with hands and has the display screen. For example, hand-held game machines, notebook PCs, and cellular phones can be used as this game apparatus. On this game apparatus, a game is played by the player who performs a rotating operation of the housing. The rotating operation refers to an operation of rotating the housing, i.e. the game apparatus itself around an axis perpendicular to the display screen. An angular velocity detection means (28, 36, 54, S7) detects an angular velocity of rotation around an axis perpendicular to the display screen. A rotation angle calculation means (36, 56, S9) calculates a rotation angle of the housing based on the detected angular velocity. A first image data storage means (78) stores data for displaying at least one first image (100) of which rotation and display are controlled according to the rotation angle. A second image data storage means (80) stores data for displaying at least one second image (102) of which display is controlled independently of the rotation angle. A first image display control means (36, 58, S13) displays on the display means the first image at least in a rotated state, based on the rotation angle. The first image is displayed in a state of being rotated according to the controlled angle. A second image display control means (36, 60, S15) controls display of the second image independently of the rotation angle. A determination means (36, 62, S17, S41, S45, S61, S63, S81, S85) determines whether or not at least one of a display angle and a display position of the first image satisfies a requirement defined by a relationship with display of the second image. Included in the requirement are, for example, that the display angle of the first image is outside a predetermined angle range defined by the second image, the display angle of the first image is within a predetermined angle range defined by the second image, the first image and the second image are in contact with each other, etc. The game progress change means (36, 64, S17, S43, S47, S65, S67, S83, S87) makes a change in the progress of a game according to the determination result.

Accordingly, it is possible to make a game progress with rotation of the first image by performing a rotating operation on the housing, i.e. on the game apparatus itself including the display screen, which allows the player to enjoy game playing in an all-new manner. In addition, the housing is rotated around an axis perpendicular to the display screen and thus never makes a game image hard to see. Moreover, the game is advanced according to a relationship between the first image rotating in line with the rotation angle and the second image controlled independently of the rotation angle, allowing the player to enjoy a new sense of game with highly entertaining characteristics.

In one embodiment, the angular velocity detection means includes a vibration gyro. Use of the vibration gyro contributes to reductions in size and manufacturing costs of the game apparatus.

In another embodiment, the first image display control means controls a display angle of the first image in such a manner that the first image rotates in a direction opposite to the rotation angle and by the same degree of angle as the rotation angle. That is, if the display screen is rotated with the rotating operation of the housing, the first image is displayed in a state where the rotation is counteracted. It thus appears to the player that the first image is at a standstill and the second image is rotated on the display screen rotated with a rotating operation of the game apparatus. This allows the player to experience a new and amusing sense of game playing with enjoyment.

A storage medium storing a game program according to the present non-limiting, exemplary embodiments is a storage medium storing a game program for realizing the function of a game apparatus comprising a housing of a size capable of being held by the player with hands, a display means including a display screen provided in the housing, an angular velocity detection means for detecting an angular velocity of a rotation around an axis perpendicular to the display screen, a first image data storage means for storing data for displaying on the display means at least one first image of which rotation and display are controlled according to the rotation angle of the housing, and a second image data storage means for storing data for displaying on the display means at least one second image of which display is controlled independently of the rotation angle of the housing, as a game apparatus on which a game is played by performing a rotating operation on the housing. The game program stored in this storage medium causes a processor of the game apparatus to execute a rotation angle calculation step, a first image display control step, a second image display control step, a determination step, and a game progress change step. In the rotation angle calculation step, a rotation angle of the housing is calculated on the basis of the angular velocity detected by the angular velocity detection means. In the first image display control step, the first image is displayed at least in a rotated state on the display means, based on the rotation angle. In the second image display control step, the display of the second image is controlled independently of the rotation angle. In the determination step, it is determined whether or not at least one of a display angle and a display position of the first image controlled in the first image display control step satisfies a requirement defined by a relationship with display of the second image. In the game progress change step, a change is made in the progress of the game according to a result of the determination in the determination step.

In one embodiment, in the first image display control step, a display angle of the first image is controlled in such a manner that the first image rotates in a direction opposite to the rotation angle and by the same degree of angle as the rotation angle.

As in the case of the above described game apparatus, the storage medium storing a game program allows the player to enjoy game playing in a new way.

A game control method according to the present non-limiting, exemplary embodiments is a game control method for a game apparatus comprising a housing of a size capable of being held by the player with hands, a display means including a display screen provided in the housing, an angular velocity detection means for detecting an angular velocity of a rotation around an axis perpendicular to the display screen, a first image data storage means for storing data for displaying on the display means at least one first image of which rotation and display are controlled according to the rotation angle of the housing, and a second image data storage means for storing data for displaying on the display means at least one second image of which display is controlled independently of the rotation angle of the housing. The game control method includes a rotation angle calculation step, a first image display control step, a second image display control step, a determination step, and a game progress change step. In the rotation angle calculation step, a rotation angle of the housing is calculated on the basis of the angular velocity detected by the angular velocity detection means. In the first image display control step, the first image is displayed at least in a rotated state on the display means, based on the rotation angle. In the second image display control step, the display of the second image is controlled independently of the rotation angle. In the determination step, it is determined whether or not at least one of a display angle and a display position of the first image controlled in the first image display control step satisfies a requirement defined by a relationship with display of the second image. In the game progress change step, a change is made in the progress of the game according to a result of the determination in the determination step.

As in the case of the above described game apparatus, this game control method allows the player to enjoy a game which is advanced by the rotating operation of the housing.

According to the present non-limiting, exemplary embodiments, a new style of game can be played by rotating the game apparatus itself around an axis perpendicular to the display screen. In addition, this rotating operation is performed around an axis perpendicular to the display screen, the game apparatus itself can be rotated without making the screen hard to see. This allows the player to enjoy this game playing to the full. Moreover, a game progresses according to a relationship between the first image rotating in line with the rotation angle of the game apparatus and the second image controlled independent of the rotation angle, which makes it possible to provide a new sense of game with highly entertaining characteristics.

Other features, aspects and advantages of the present non-limiting, exemplary embodiments will become more apparent from the following detailed description of the present invention when taken in conjunction with the accompanying drawings.

BRIEF DESCRIPTION OF THE DRAWINGS

FIG. 1(A) presents a front view of a game machine and a cartridge, and FIG. 1(B) presents a side view of the cartridge seen from IB;

FIG. 5(A) shows a game image at a start of the game, and FIG. 5(B) shows a game image in which the game apparatus is rotated around a Z axis in a left-handed direction;

FIG. 8(A) shows a game image at a start of the game, and FIG. 8(B) shows a game image in which the game apparatus is rotated by a predetermined angle;

FIG. 6 is performed;

DETAILED DESCRIPTION OF NON-LIMITING EXEMPLARY EMBODIMENTS

Figure 1:
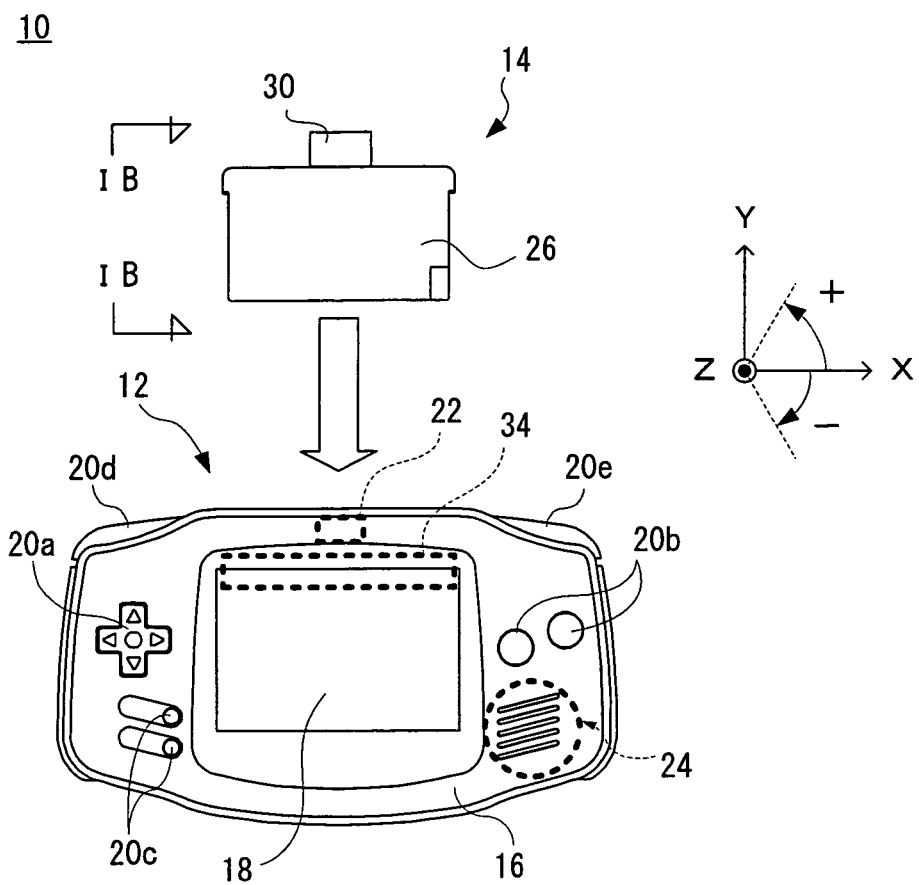
FIG. 1 is an outline view showing a game apparatus of one embodiment of the present non-limiting, exemplary embodiments.
Figure 1:
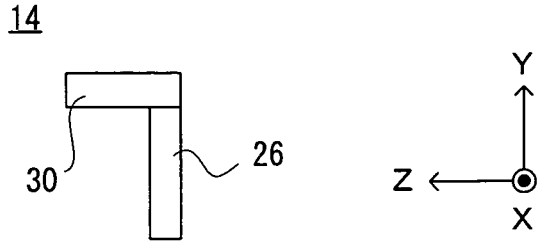

A game apparatus 10 of this embodiment shown in FIG. 1 includes a game machine 12 and a cartridge 14 connected to the game machine 12. The game machine 12 is a hand-held game machine of a size capable of being held with both hands, and makes it possible to enjoy various games by replacing a cartridge 14 storing a game program and data as a detachable/attachable external storage medium.

The game machine 12 includes a long-sideways housing 16, for example. Provided on approximate center of a principal surface (front side) of the housing 16 is a liquid crystal display (hereinafter referred to as "LCD") as one example of an image display means. The LCD 18 displays a game image on its display screen.

Additionally, the game machine 12 is not limited to a hand-held dedicated game machine, and may be based on a small computer equipped with a housing of a size capable of being held at its both ends by a player with hands and a display screen on which a game image is displayed. The game machine 12 is applicable to notebook PCs, PDAs, cellular phones, etc. Moreover, the game information storage medium is not limited to the cartridge 14, and is applicable to various information storage media including optical information storage media such as CD-ROMs and DVD-ROMs, magnetic optical disks and magnetic disks.

Right and left ends of the housing 16 are provided with various operating switches 20a to 20e (collectively indicated by numeral "20") as an operation means for the player to conduct an operation. The operating switch 20 includes a direction switch 20a, an action switch 20b, a start/select button 20c, an L button 20d provided at a left corner of the housing 16, and an R button 20e provided at a right corner of the housing 16, for example. Operations specified by the switches or buttons included in the operating switch 20 vary depending on the contents of a game program processed on the game apparatus 10. For instance, the direction switch 20a is used for movement of a cursor for selecting an option, and the action switch 20b is used for confirmation/cancellation of a selected option. The L button 20d and the R button 20e are utilized for specifying an action assigned to the action switch 20b or other actions. The start/select button 20c is employed for starting a game or suspending a game operation.

Besides, the game machine 12 is provided with an external expansion connector 22 (indicated by a broken line) on upper surface of the housing 16 as required. The connector 22 is for connection with another game apparatus 10 (or another game machine 12). Via the connector 22, communication games and data transmission/reception can be done with another game apparatus 10. In addition, a speaker 24 (indicated by a broken line) is included in the inside of a sound release hole provided on the front side of the housing 16. The speaker 24 outputs such sounds as BGM and sound effects.

The cartridge 14 includes a housing 26 that is inserted into a receptacle (not illustrated) provided on the rear side of the housing 16 of the game machine 12. Also, as an angular velocity detection means (angular velocity sensor), a gyro sensor 28 (FIG. 2) is built in the cartridge 14, and a housing 30 storing the gyro sensor 28 is formed integrally with and orthogonal to the housing 26. When the cartridge 14 is attached to the game machine 12, the housing 26 becomes parallel with the display screen of the game machine 12 and the housing 30 becomes perpendicular to the display screen. In the housing 30, the gyro sensor 28, when attached to the game machine 12, is implemented in a state that can detect an angular velocity of a rotation around an axis (Z axis in FIG. 1) perpendicular to the display screen. The gyro sensor 28 is acceptable only if it detects an angular velocity of one axis (Z axis).

For directions of an angle of a rotation around the Z axis, the direction of a left-handed (counterclockwise) rotation is positive and the direction of a right-handed (clockwise) rotation is negative, as shown in FIG. 1. Also, an X axis and Y axis are parallel with the display screen, and the X axis corresponds to the lateral side of the housing 16 and the Y axis corresponds to the longitudinal side of the housing 16. In addition, the X, Y and Z axes correspond to a pitch axis, roll axis and yaw axis of the housing 16, respectively.

A connector 32 (FIG. 2) is formed on an end of the housing 26 on the side of insertion, and a connector 34 (indicated by a broken line in FIG. 1) is formed on back of the receptacle of the game machine 12. When the cartridge 14 is attached to the game machine 12, the connector 32 and the connector 34 are hooked up to each other and a CPU 36 (FIG. 2) of the game machine 12 gains access to the cartridge 14. By attachment of the cartridge 14 with the built-in gyro sensor 28, the game machine 12 functions as a game apparatus 10 on which a game is played by rotating itself around an axis perpendicular to the display screen.

Figure 2:
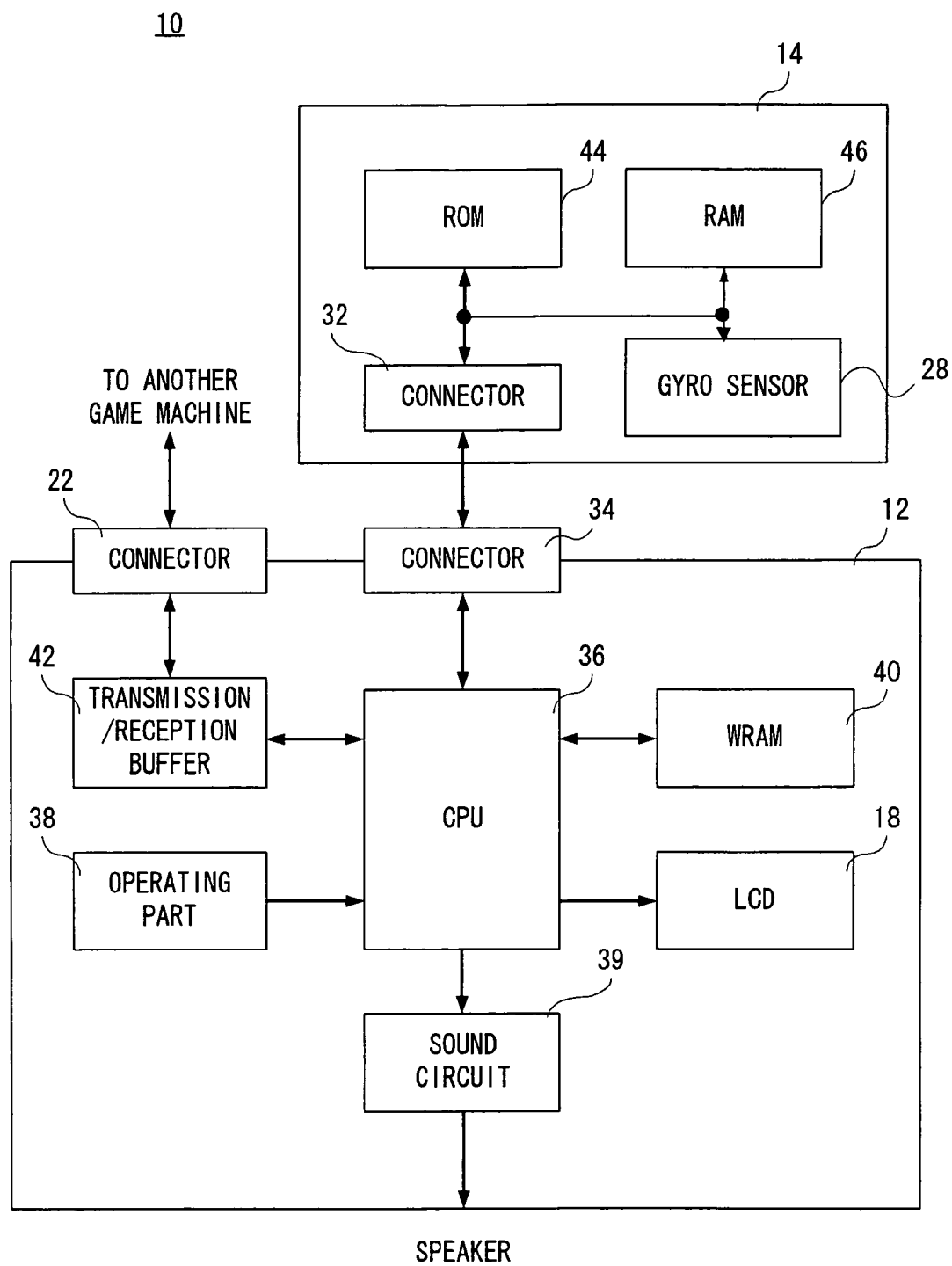
FIG. 2 is a block diagram showing an electrical structure of the game apparatus of the FIG. 1 embodiment.

FIG. 2 shows one example of an electrical structure of the game apparatus 10. Referring to FIG. 2, the game machine 12 includes the CPU 36. The CPU 36 is also called as computer or processor and controls the game machine 12 globally. The CPU 36 is connected with the LCD 18, the connector 34, an operation part 38, a work memory (WRAM) 40 via a bus, and with a transmission/reception buffer 42, a sound circuit 39, etc.

The LCD 18 is provided with display data from the CPU 36 and displays a game image on its display screen. Incidentally, although not illustrated, the CPU 36 is connected with a VRAM, an LCD controller, etc. Rendered on the VRAM are game images including images of backgrounds (BGs), player characters, non-player characters, items, etc. Player character here refers to a moving image character of which an arbitrary action such as movement is controlled by the player's operation. In this embodiment, the player plays a game with a rotation of a rotational image (first image) by rotating the game apparatus 10 around an axis perpendicular to the display screen. Thus, this rotational image (the image rotating in response to the rotation of the game apparatus 10) corresponds to a player character. Meanwhile, a non-player character here denotes a moving image character of which an arbitrary action such as movement is controlled independently of the player's operation by the computer (the CPU 36). In this embodiment, an irrotational image (second image) controlled independently of the rotation of the game apparatus 10 corresponds to a non-player character. Additionally, the LCD controller reads out the game image data (display data) rendered in the VRAM and displays a game image on the LCD 18 under instructions from the CPU 36.

The operating part 38 includes the above described operating switch 20 and provides the CPU 36 with operation input data according to the manipulation of the individual operating switches. In consequence, the CPU 36 performs a process according to the instructions of the player (user) given through the operating part 38.

The WRAM 40 is a writable/readable memory and used as a working area or buffer area of the CPU 36. The WRAM 40 temporarily stores data generated during a game process. The transmission/reception buffer 42 is intended for temporary accumulation of data transmitted to or received from another game apparatus or game machine, for example, data exchanged during a communication game for multi-players, and it is connected with the external expansion connector 22. For communications with another game apparatus, the connector 22 is connected with that game apparatus via a communication cable or the like not illustrated here.

Additionally, the CPU 36 is connected with the speaker 24 via the sound circuit 39. Audio data provided from the CPU 36 is converted into an analog signal by the sound circuit 39. The speaker 24 then outputs such sounds as game music and sound effects.

As well as the above mentioned gyro sensor 28, the cartridge 14 contains a ROM 44 and a RAM 46 that are connected to the connector 32 via a bus or the like. When the cartridge 14 is attached to the game machine 12 and the connector 32 and connector 34 are joined to each other, the CPU 36 is electrically connected to the gyro sensor 28, ROM 44 and RAM 46. This allows the CPU 36 to access the ROM 44 and RAM 46 or the gyro sensor 28 to control the cartridge 14 or exchange data with the cartridge 14.

The ROM 44 stores in advance a game program and data for making the game machine 12 function as a game apparatus 10 on which a game is played by its own rotation. The RAM 46 is a writable/readable memory for saving game data and the like, and is applicable to a flash memory as a nonvolatile memory and an SRAM powered by batteries, for example.

The gyro sensor 28 includes a vibration gyro (e.g. piezoelectric gyro), an operational amplifier, an A/D converter, etc. The vibration gyro detects an angular velocity from a change in vibration based on Coriolis force that acts in response to a rotation. In the case of a piezoelectric gyro, for example, a detection piezoelectric element detects a change in vibration of a vibration piezoelectric element due to Coriolis force. The detected signal is amplified by the operational amplifier and converted into digital data by the A/D converter. The gyro sensor 28 of this embodiment outputs the detected angular velocity as a value of 0 to 4095 (4096 grades), for example. The CPU 36 of the game machine 12 obtains this output data and detects the angular velocity value. However, the gyro sensor 28 continues to output some value even if it is not rotated. Assuming that an angular velocity value output at a time when the sensor is regarded as being not rotated is a neutral position value, an actual angular velocity value is figured out by subtracting the neutral position value from the obtained angular velocity value. For example, the CPU 36 obtains output data from the gyro sensor 28 each one display frame (1/60 second), calculates an angular velocity value of the frame, and determines an angle of a rotation of the game apparatus 10 based on the calculated angular velocity value. As stated above, the gyro sensor 28 detects an angular velocity of a rotation around an axis (Z axis: refer to FIG. 1) perpendicular to the display screen of the game machine 12, and the CPU 36 thus calculates an angle of the rotation around the Z axis of the game apparatus 10. In this manner, since the vibration gyro is used as an angular velocity detection means, the game apparatus 10 can be configured in a small size and at inexpensive costs.

Incidentally, in this embodiment, the game apparatus 10 includes the game machine 12 and the cartridge 14 which are separated from each other. As an alternative, they may be formed in an integral manner. That is, the ROM 44, RAM 46 and gyro sensor 28 may be contained in the game machine 12.

Figure 3:
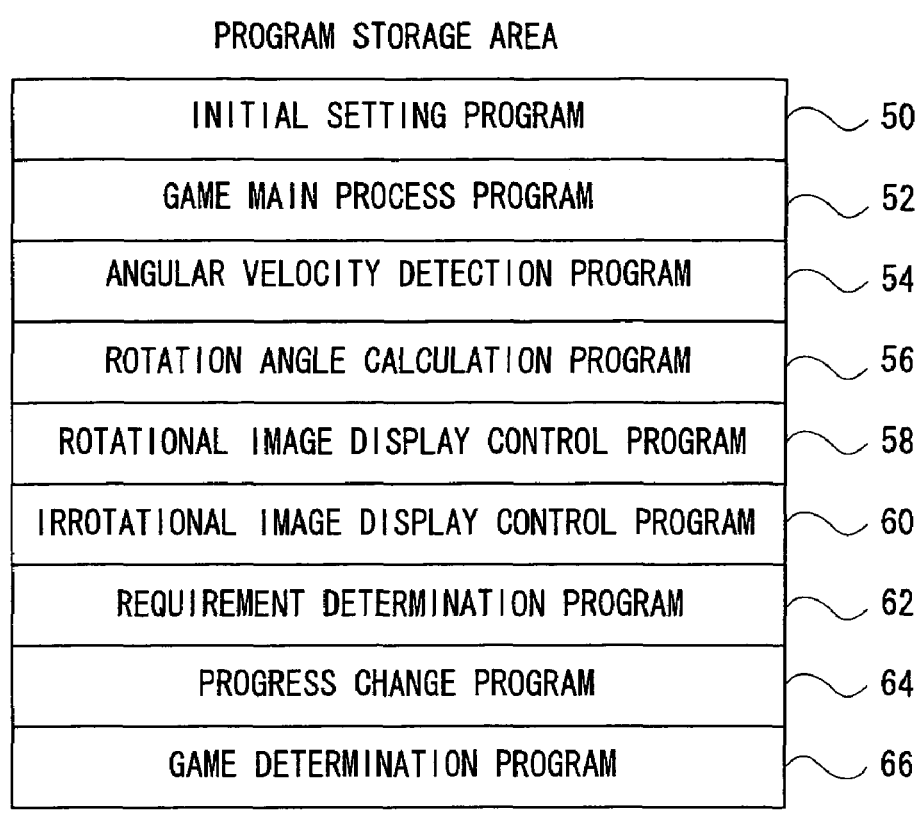
FIG. 3 is an illustrative view showing one example of a program storage area in a memory map of the game apparatus of the FIG. 1 embodiment.

FIG. 3 presents one example of a program storage area in a memory map of the game apparatus 10. The program storage area is provided in the ROM 44. The program storage area stores various programs for making the game machine 12 function as the game apparatus 10 of the present invention, which are executed by the CPU 36.

The program storage area includes an initial setting program storage area 50, a game main process program storage area 52, an angular velocity detection program storage area 54, a rotation angle calculation program storage area 56, a rotational image display control program storage area 58, an irrotational image display control program storage area 60, a requirement determination program storage area 62, a progress change program storage area 64, a game determination program storage area 66, etc.

The initial setting program storage area 50 stores programs for clearing the work area and buffer area of the WRAM 40, setting initial values of various variables and flags, and setting an initial value of a neutral position, which are performed at a start of a game process. The game main process program storage area 52 stores a program for executing a game main process.

The angular velocity detection program storage area 54 stores a program for obtaining output data from the gyro sensor 28 and detecting an angular velocity. According to this program, the CPU 36 obtains angular velocity value data at specific time intervals (e.g. one display frame), and determines an angular velocity value at that time by subtracting the neutral position value from the obtained angular velocity value.

The rotation angle calculation program storage area 56 stores a program for calculating a rotation angle of the game apparatus 10 based on the detected angular velocity value. As mentioned above, since an angular velocity value is detected at specific time intervals, an angle of a rotation from the previous detection time to the current detection time is determined by product (multiplication) of the detected angular velocity value and the time. Then, by adding the calculated rotation angle to the rotation angle until the previous detection time, a rotation angle of the game apparatus 10 at the current detection time is figured out. Additionally, as discussed above, since the gyro sensor 28 detects an angular velocity of a rotation around an axis (Z axis) perpendicular to the display screen of the game apparatus 10, the angle of the rotation around the Z axis of the game apparatus 10 is calculated.

The rotational image display control program storage area 58 stores a program for controlling display of a rotational image (first image) rotated in response to the rotation of the game apparatus 10. A game image presents at least one rotational image. According to this program, the CPU 36 updates control data for a rotational image as required. In this embodiment, such images as player characters, non-player characters and backgrounds are displayed on the basis of control data including image designation data, display position data, display angle data, etc. More specifically, an image is displayed on the display screen of the LCD 18, with use of image data designated by the image designation data, in a position designated by the display position data, and in a state of being rotated around the Z axis by the degree of angle designated by the display angle data. The display angle of a rotational image is controlled on the basis of the rotation angle of the game apparatus 10 calculated by the rotation angle calculation program. In this embodiment, a display angle of a rotational image is set to a value with which the image is rotated from the position of the initial value in a direction opposite to the rotation angle of the game apparatus 10 and by the same degree of angle as the rotation angle of the game apparatus 10. Therefore, the rotational image is rotated in such a manner as to counteract the rotation of the display screen by a rotating operation. This makes the rotational image appear to remain at the initial display angle without any rotation on the display screen rotated together with the housing 16. In addition, the display position of a rotational image can be controlled in an arbitrary way. The position may be controlled independently of the rotation angle of the game apparatus 10, may be fixed in a predetermined position, or may be controlled on the basis of the rotation angle of the game apparatus 10.

The irrotational image display control program storage area 60 stores a program for controlling display of an irrotational image (second image) controlled independently of the rotation of the game apparatus 10. A game image presents at least one irrotational image. According to this program, the CPU 36 updates control data for an irrotational image as required. However, control data for an irrotational image (including image designation data, display position data, display angle data, etc.) is controlled independently of the rotation angle of the game apparatus 10 calculated by the rotation angle calculation program. Thus, an irrotational image appears to rotate according to the rotation of the game apparatus 10 on the display screen rotated together with the housing 16.

The requirement determination program storage area 62 stores a program for determining whether or not the state of a rotational image satisfies a predetermined requirement in a relationship with an irrotational image. More specifically, with this program, it is determined whether or not at least one of the position and the angle of a rotational image satisfies the predetermined requirement in a relationship with an irrotational image. The predetermined requirement is defined by a relationship between display of a rotational image and display of an irrotational image. For example, it is determined whether or not the rotational image rotates by the degree of angle defined by the irrotational image (that is, whether or not the display angle of the rotational image has reached the angle defined by the irrotational image), or whether or not the rotational image has come in contact with the irrotational image.

The progress change program storage area 64 stores a program for bringing about a change in the progress of a game depending on a result of determination by the requirement determination program. For example, according to the determination result, a player's score is increased or decreased, or it is concluded that the game is cleared or the game is over. The game determination program storage area 66 stores a program for determining whether the game is cleared or not or whether the game is over or not. Incidentally, although omitted in FIG. 3, the program storage area also stores other necessary programs including a program for outputting game sounds.

Figure 4:
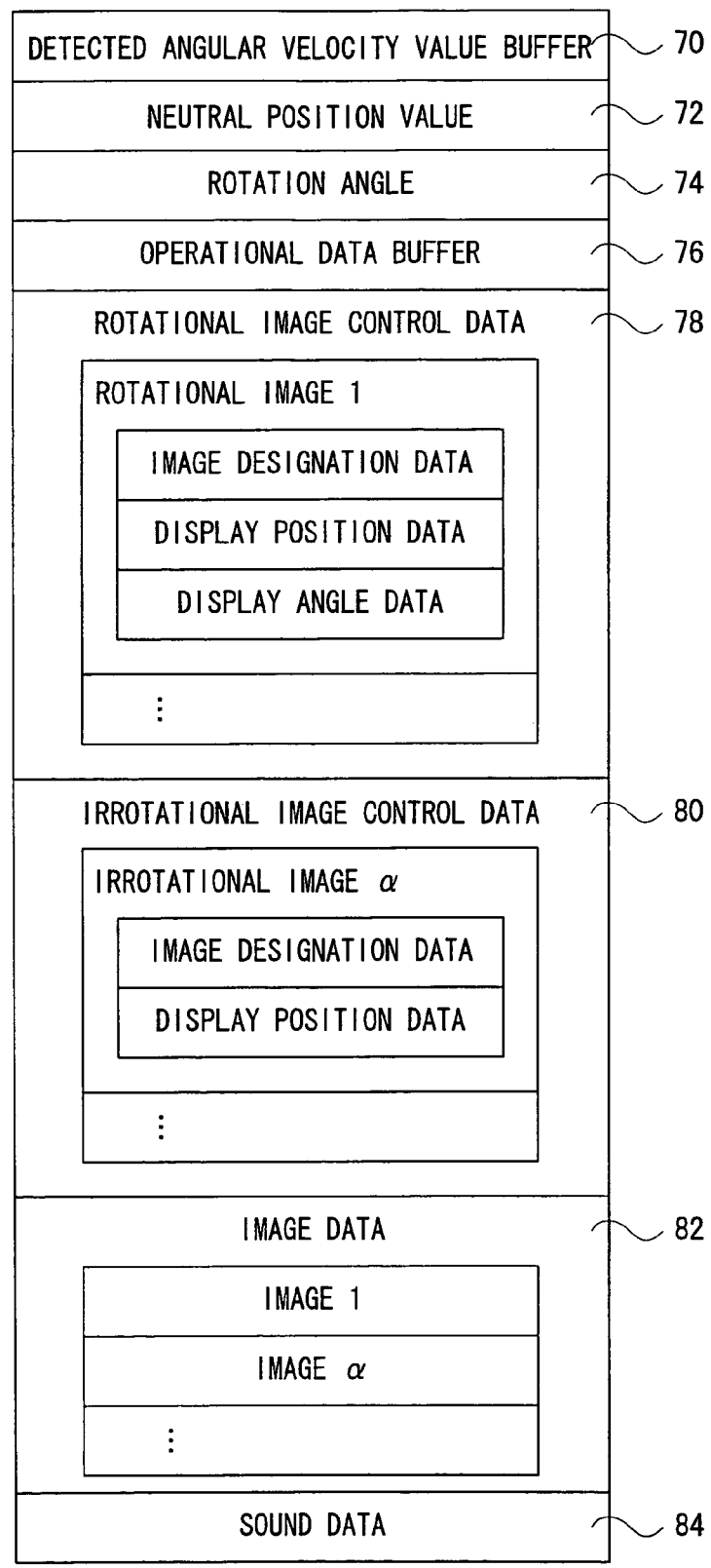
FIG. 4 is an illustrative view showing one example of a data storage area in the memory map of the game apparatus of the FIG. 1 embodiment.

FIG. 4 shows one example of a data storage area in the memory map of the game apparatus 10. The data storage area is provided in the ROM 44, WRAM 40, etc. The data storage area stores in advance various kinds of data used at execution of a game program, and temporarily stores data generated or obtained during a game process.

The data storage area includes a detected angular velocity value buffer area 70, a neutral position value area 72, a rotation angle area 74, an operational data buffer area 76, a rotational image control data area 78, an irrotational image control data area 80, an image data area 82, a sound data area 84, etc.

The detected angular velocity value buffer area 70 stores angular velocity value data from the gyro sensor 28, which is detected by the angular velocity detection program. The neutral position value area 72 stores neutral position value data in which an angular velocity value output from the gyro sensor 28 when the game apparatus 10 is regarded as being not rotated is assumed as a value in a neutral position. This neutral position value can be momentarily changed according to the characteristics of the gyro sensor. The rotation angle area 74 stores rotation angle data calculated by the rotation angle calculation program. The operational data buffer area 76 stores operational input data from the operating part 38.

The rotational image control data area 78 stores control data for controlling display of a rotational image. If there exist a plurality of rotational images, the area 78 stores control data for the plurality of rotational images. The control data includes image designation data, display position data, display angle data, etc. The image designation data is data for designating image data to be used for display of a rotational image. The display position data is a data for designating the position where the image data of a rotational image is to be displayed. The display angle data is data for designating the angle at which the image data of a rotational image is to be displayed. The image data is thus displayed in a state of being rotated around the Z axis by the degree of angle designated by the display angle data.

The irrotational image control data area 80 stores control data for controlling display of an irrotational image. If there exist a plurality of irrotational images, the area 80 stores control data for the plurality of irrotational images. The irrotational image control data includes image designation data, display position data, etc. The image designation data is data for designating image data to be used for display of an irrotational image. The display position data is a data for designating the position where the image data of an irrotational image is to be displayed.

The image data storage area 82 stores image data for displaying a rotational image, irrotational image, etc. The sound data storage area 84 stores sound data for generating game sounds such as BGM and sound effects. Incidentally, although omitted in FIG. 4, the data storage area also stores other data required for the progress of a game, including a game-is-cleared flag and a game-is-over flag.

On this game apparatus 10, the player plays a game by rotating the game apparatus 10 around an axis (Z axis) perpendicular to the display screen. It is assumed here that an operation of rotating the game apparatus 10 around the Z axis is referred to as a rotating operation. When the player performs a rotating operation, the angle of rotation of the game apparatus 10 by the rotating operation is calculated on the basis of an angular velocity value detected by the gyro sensor 28. A rotational image is rotated according to the angle of rotation of the game apparatus 10, while an irrotational image is displayed independently of the angle of the rotation. In this embodiment, a rotational image is rotated in a direction opposite to the rotation angle of the game apparatus 10 and by the same degree of angle as the rotation angle of the game apparatus 10. When a rotating operation is performed, the display screen fixed to the housing 16 rotates at the same time, and it thus appears to the player that the rotational image is at a standstill without any rotational motion and that the irrotational image rotates in contrast to that. The player plays a game while seeing such a game image. Then, it is determined whether or not a relationship between the rotational image and the irrotational image has satisfied a predetermined requirement, and the progress of the game is changed according to the determination result.

Figure 5:
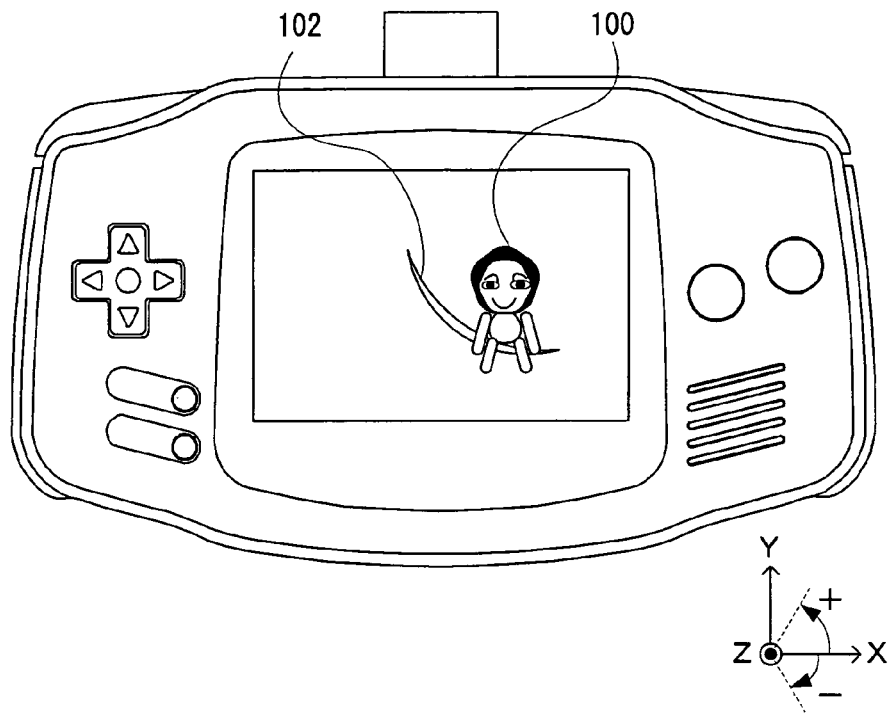
FIG. 5 is an illustrative view showing an overview of one example of a game played on the game apparatus of the FIG. 1 embodiment.
Figure 5:
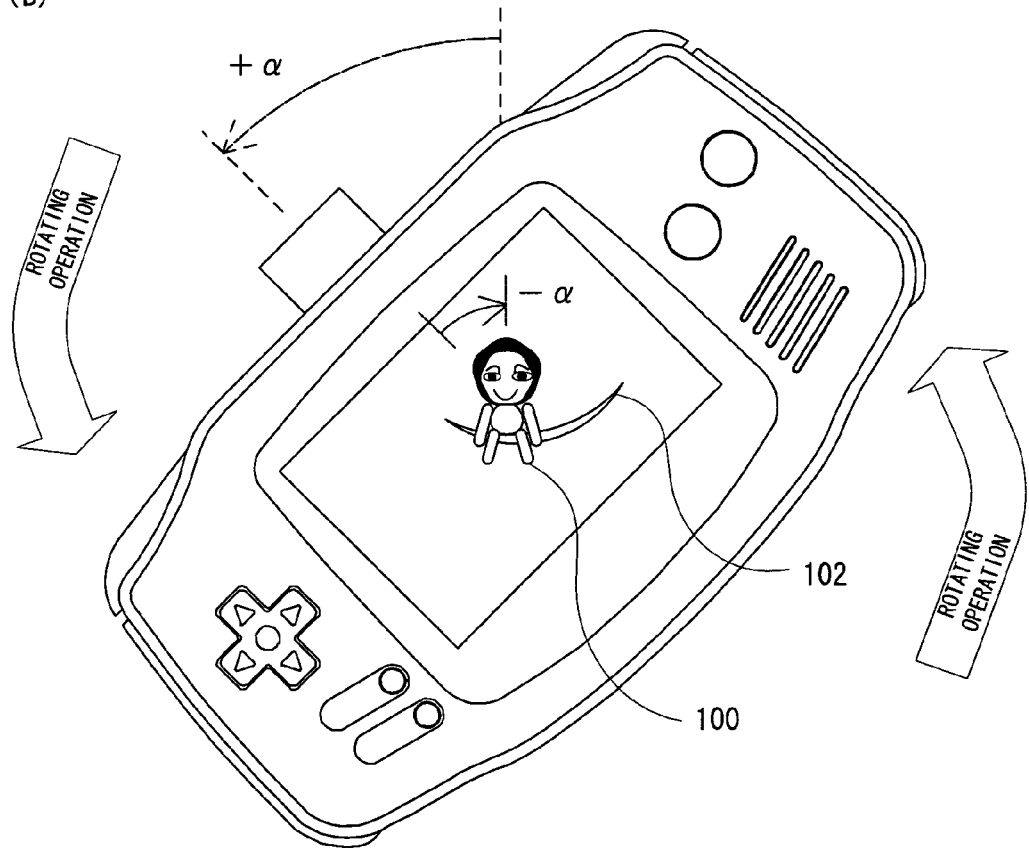

FIG. 5 presents an overview of one example of a game played on the game apparatus 10. FIG. 5(A) shows a game image at a start of the game on which a rotational image 100 is on a crescent-shaped irrotational image 102. In the game of FIG. 5, the player rotates the rotational image 100 by performing a rotating operation to slide it over the irrotational image 102. The irrotational image 102 is controlled so as to stand still in a predetermined position independently of the rotating operation. Meanwhile, the rotational image 100 is displayed at a display angle at which it is rotated in a direction opposite to the rotation angle and by the same degree of angle as the rotation angle. It appears to the player that the rotational image 100 remains stationary as in the initial state and that the irrotational image 102 makes a rotational movement. Then, the game is over if the rotational image 100 has remained on the irrotational image 102 even after a lapse of a predetermined time, and the game is cleared if the image 100 has slipped off the image 102 during that time. More specifically, rotation angles at which the rotational image 100 slides off the irrotational image 102 are preset on the basis of the shape, position, etc. of the irrotational image 102. In this example, the rotational image 100 can remain on the irrotational image 102 if the rotation angle of the game apparatus 10 is within a range of −45 to +90 degrees. That is, the display angle of the rotational image 100 in this embodiment is changed in a direction opposite to the rotation angle and by the same degree of angle as the rotation angle, and thus the rotational image 100 remains on the irrotational image 102 if the display angle of the rotational image 100 changes within a range of +45 to −90 degrees from the initial angle, and the display position of the rotational image 100 moves along the shape of the irrotational image 102 in a such a manner as to trace an arc, for example.

Additionally, at a start of a game, the player holds the housing 16 of the game apparatus 10 in such a manner as shown in FIG. 5(A), that is, in such a manner that the X axis is laterally positioned with respect to the body of the player and that the Y axis is longitudinally positioned with respect to the body of the player. Thus, the calculated rotation angle of the game apparatus 10 is an angle at which the apparatus 10 is rotated around the Z axis from the state when the game is started.

FIG. 5(B) shows one example of a game image in which the game apparatus is subjected to a rotating operation. More specifically, the game apparatus 10 is rotated by $\alpha$ degrees of angle in a left-handed direction around the Z axis from the state shown in FIG. 5(A). This angle of +$\alpha$ degrees falls within a predetermined range of angles at which the rotational image 100 can remain on the irrotational image 102. In this case, the display angle of the rotational image is set to a value with which the image is rotated by −$\alpha$ degrees from the initial value, that is, the rotational image 100 is displayed in a state of being rotated by $\alpha$ degrees of angle in a right-handed direction from the initial state. Thus, it appears to the player that the rotational image 100 remains at rest without rotation and that, on the contrary, while the irrotational image 102 rotates with the rotation of the game apparatus 10.

Figure 6:
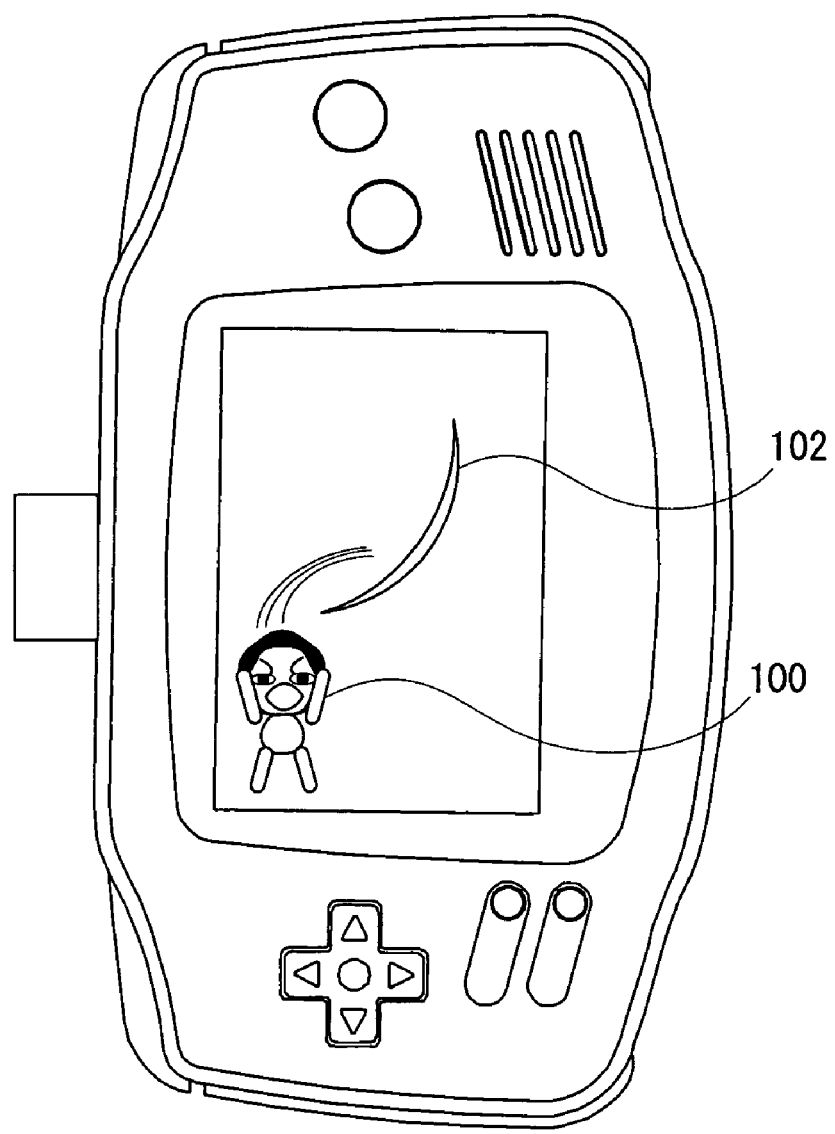
FIG. 6 is an illustrative view showing a game image in which the game apparatus is further rotated in the game of FIG. 5.

Meanwhile, FIG. 6 shows one example of a game image in which the rotation angle of the game apparatus 10 falls outside the predetermined range of angles. More specifically, presented in the drawing is the game image in which the rotation angle of the game apparatus 10 exceeds +90 degrees and the display angle of the rotational image 100 is set to a value with which the image 100 is rotated from the initial value in a direction opposite to the rotation angle and by the same degree of angle as the rotation angle. Since the rotation angle has become outside the predetermined range of angles, such a game image where the rotational image 100 is falling off the irrotational image 102 is displayed.

Figure 7:
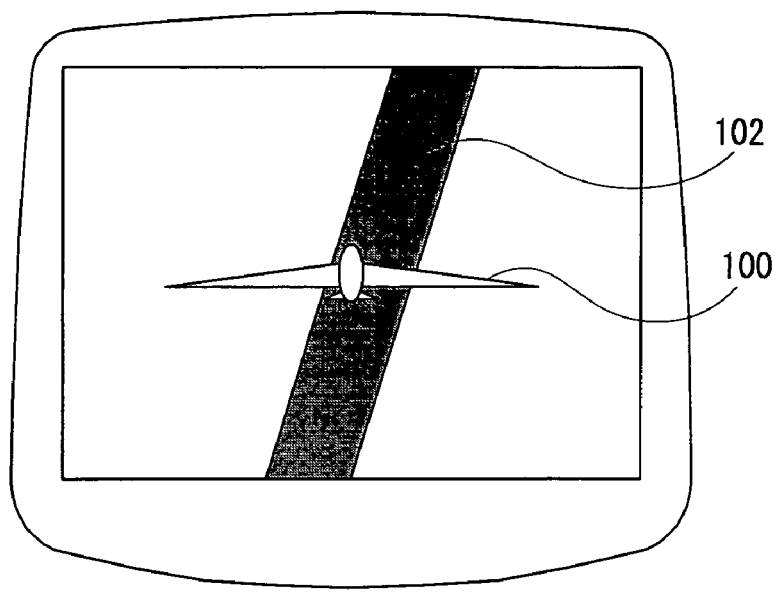
FIG. 7 is an illustrative view showing an overview of another example of a game played on the game apparatus of the FIG. 1 embodiment, FIG. 7(A) denotes a game image at a start of the game, and FIG. 7(B) denotes a game image in which the game apparatus is rotated by a predetermined angle.
Figure 7:
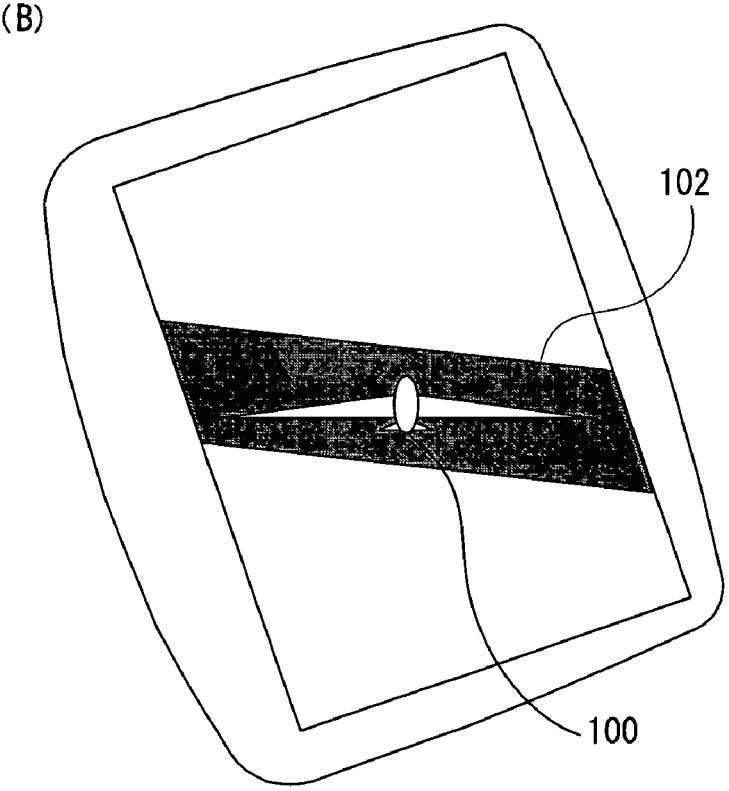

In addition, FIG. 7 presents an overview of another example of a game played on the game apparatus 10. FIG. 7(A) shows a game image at a start of the game in which a rotational image 100 indicative of a plane and an irrotational image 102 indicative of a crevice are displayed. In the game of FIG. 7, the display position of the rotational image 100 is fixed at the center of the display screen. On the other hand, the irrotational image 102 is controlled, independently of the rotation angle, in such a manner as to come close gradually to the rotational image 100. As shown in FIG. 7(B), the player is required to perform a rotating operation to rotate the rotational image 100 and let it pass through the irrotational image 102. The display angle of the rotational image 100 in this embodiment is controlled according to the rotation angle of the game apparatus 10 as in the case with the example of FIG. 5. Accordingly, it appears to the player that the rotational image 100 remains at rest and that the irrotational image 102 makes a rotational movement. The game is cleared if the plane 100 has passed through the crevice 102, and the game is over if it has not done. More specifically, when a predetermined time has passed, it is determined whether or not the display angle of the rotational image 100 falls within a predetermined angle range in which the rotational image 100 fits into a display area of the irrotational image 102. Alternatively, it may be determined whether or not the rotation angle of the game apparatus 10 falls within a predetermined angle range.

Figure 8:
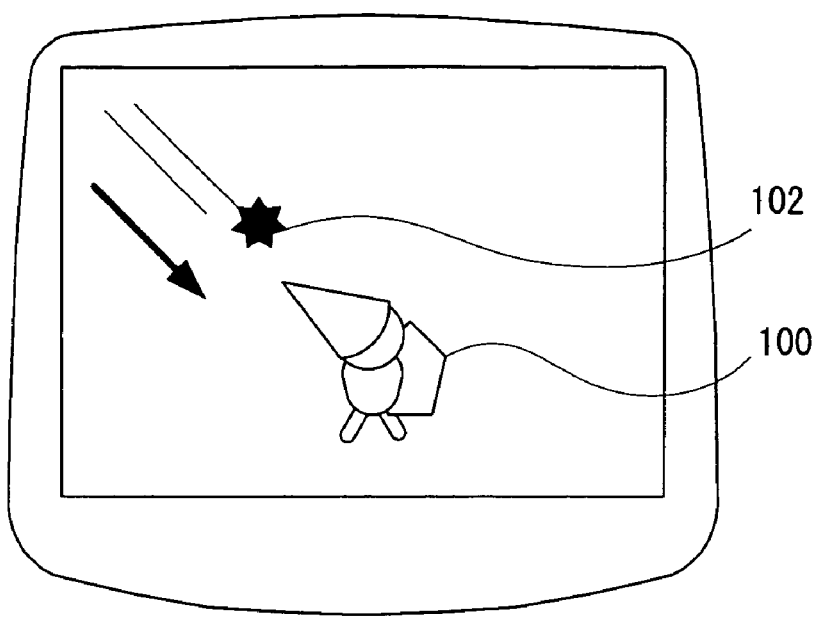
FIG. 8 is an illustrative view showing an overview of still another example of a game played on the game apparatus of the FIG. 1 embodiment.
Figure 8:
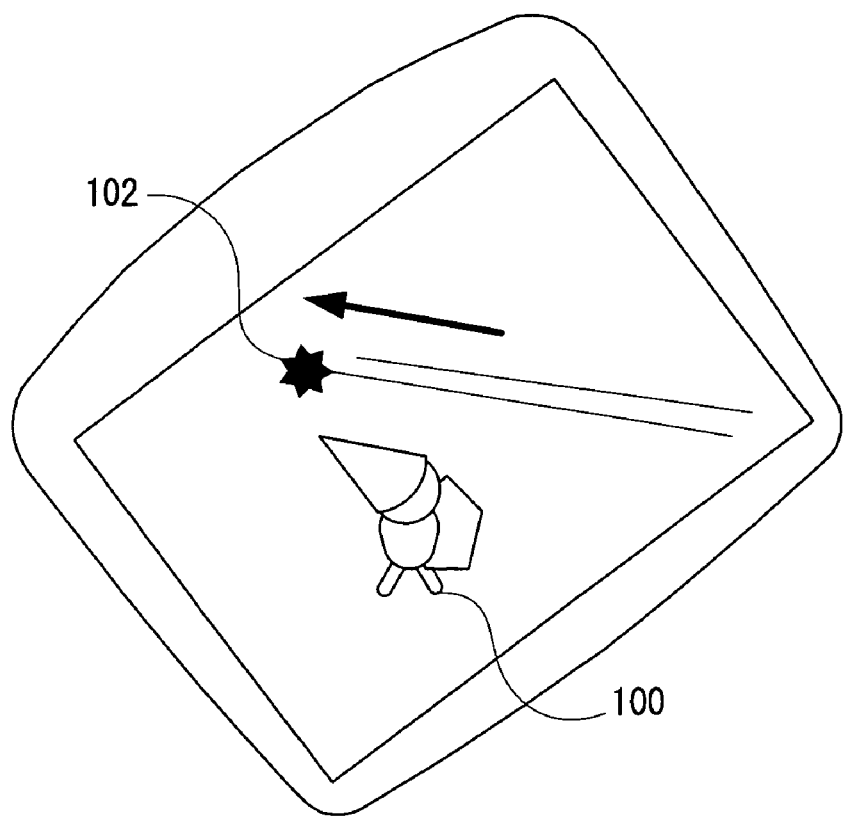

Also, FIG. 8 shows an overview of still another example of a game played on the game apparatus 10. FIG. 8(A) presents a game image at a start of the game. In the game of FIG. 8, an irrotational image 102 is controlled in such a manner as to go straight toward the rotational image 100, for example. The player is thus required to avoid the rotational image 100 from coming into contact with the irrotational image 102 by performing a rotating operation. The display angle of the rotational image 100 is controlled according to the rotation angle of the game apparatus 10, as in the case with the example of FIG. 5. Also, the display position of the rotational image 100 is controlled according to the rotation angle in such a manner that a distance from the center of the display screen remains constant, for example. This makes it possible to avoid the straight-going irrotational image 102 by performing a rotating operation. In the game of FIG. 8 as well, it appears that the rotational image 100 remains at rest and that the irrotational image 102 makes a rotational movement. More specifically, it is determined whether or not the rotational image 100 has come in contact with the irrotational image 102 or whether or not the rotational image 100 has avoided the irrotational image 102, based on the display position data of the rotational image 100 and irrotational image 102. Then, the score for the player (or the life of the player character 100) is decreased if the rotational image 100 has made contact with the irrotational image 102, and the score or life is increased if the rotational image 100 has succeeded in avoiding the irrotational image 102, for example. The game is cleared if the score, etc. has exceeded a predetermined value, and the game is over if the score, etc. has becomes zero.

Figure 9:
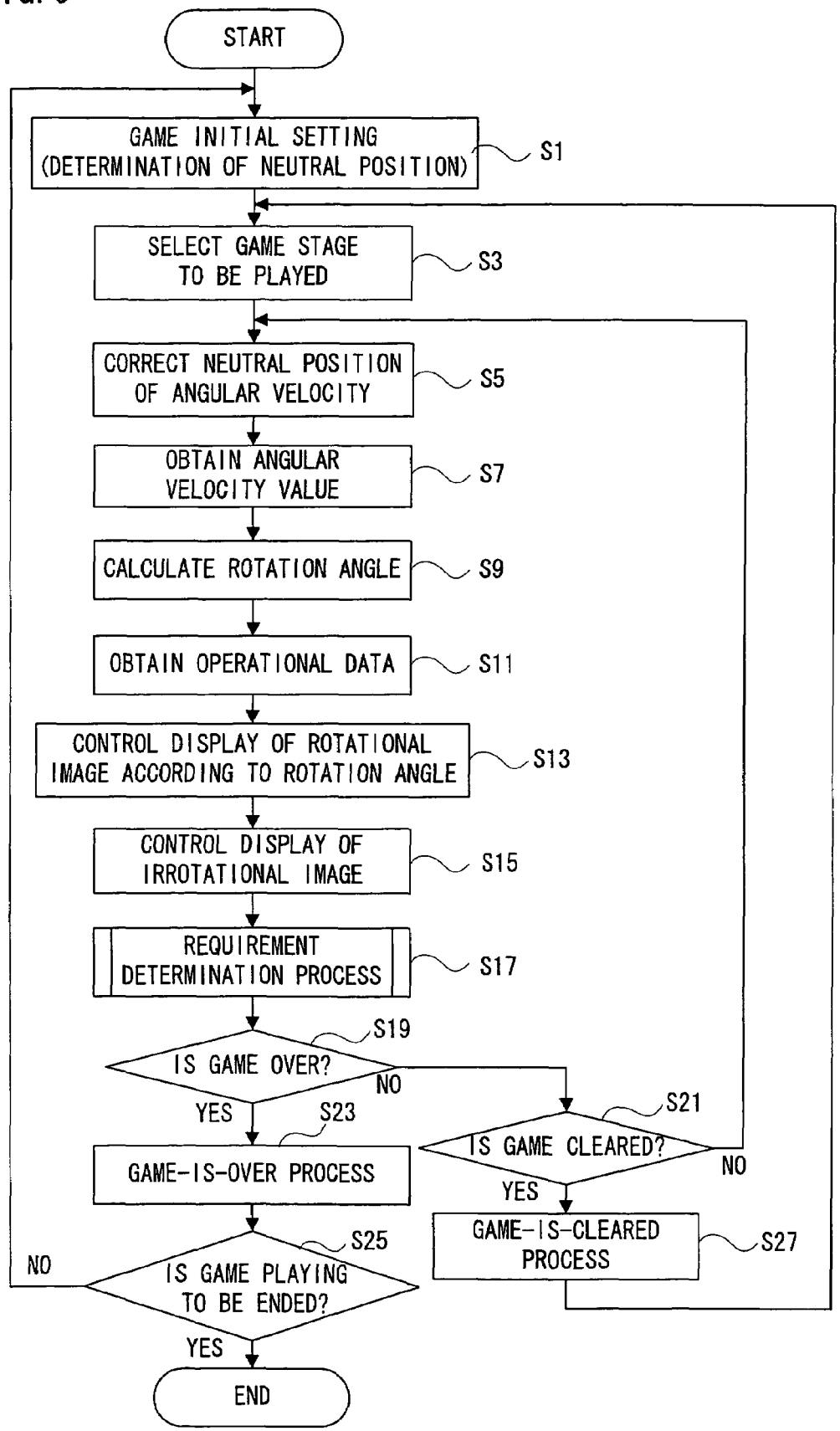
FIG. 9 is a flowchart showing one example of a game operation of the game apparatus of the FIG. 1 embodiment.

FIG. 9 shows one example of a game operation of the game apparatus 10. In a first step S1 of FIG. 9, the CPU 36 makes game initial settings: for example, clears working areas and buffer areas in the WRAM 40, sets an initial value of a neutral position, or assigns initial values to all kinds of variables and flags. The gyro sensor 28 of this embodiment constantly outputs some value regardless of the presence or absence of a rotation. Thus, an angular velocity value output from the gyro sensor 28 when it is regarded that there is no rotational movement is set and stored as an initial value for the neutral position so as to calculate an actual angular velocity value in the presence of a rotational movement. That is, an angular velocity value output from the gyro sensor 28 when it is regarded that there is no rotational movement is detected, and a neutral position value is set on the basis of the detected angular velocity value. The neutral position value determined in this manner is stored in the neutral position value data area 72 of the data storage area.

Next, in a step S3, the CPU 36 selects a game stage in which a game is to be played. In this embodiment, a plurality of game stages are provided as shown in FIG. 5 to FIG. 8, for example. In the step S3, displayed is a selection screen for making the player select a game stage, for example. Then, a game stage is selected on the basis of operational input data from the operating part 38.

When the game in the selected stage has started, the CPU 36 executes operations in a following step S5 to step S21 at specific time intervals, such as each one display frame. In the step S5, the CPU 36 firstly corrects the neutral position value of an angular velocity. The correction process is performed because the neutral position value may be shifted due to the characteristics of the gyro sensor 28. For instance, if it is judged that a plurality of angular velocity values obtained in a predetermined period until this time are stable, the CPU 36 determines whether or not there is no difference between these values and the neutral position value set in the step S1 or corrected in the step S5. If there exists any difference, the neutral position value is corrected (by calculating an average of the angular velocity values judged as being stable to update the neutral position value, for example) so as not to cause discomfort in game playing.

In the step S7, the CPU 36 obtains the angular velocity value from the gyro sensor 28 and stores it in the detected angular velocity value buffer area 70. Then, by subtracting the neutral position value from the obtained angular velocity value, the actual angular velocity value is figured out.

In the step S9, the CPU 36 calculates the rotation angle of the game apparatus 10 and stores it in the rotation angle data area 74. More specifically, by product of the detected angular velocity value and the detection time interval, the angle of a rotation from the previous detection time to the current detection time is worked out. Then, by adding the calculated angle to the rotation angle until the previous time, the rotation angle at the current time is determined.

In the step S11, the CPU 36 obtains operational input data from the operating part 38 and stores it in the operational data buffer area 76.

In the step S13, the CPU 36 controls display of a rotational image based on the rotation angle. More specifically, the display angle of a rotational image 100 is controlled on the basis of the rotation angle calculated in the step S9. In this embodiment, the display angle of the rotational image 100 is set to a value with which the image 100 is rotated from the initial value in a direction opposite to the rotation angle and by the same degree of angle as the rotation angle. In this step S13, control data of the rotational image 100 is updated as required and stored in the rotational image control data area 78. Also, the display position of the rotational image 100 may be controlled as necessary on the basis of the rotation angle. Accordingly, the rotational image 100 rotated on the basis of the rotation angle is displayed on the display screen.

In the step S15, the CPU 36 controls display of an irrotational image. The display position and display angle of the irrotational image 102 are controlled independently of the rotation angle. In this step S15, the control data of the irrotational image 102 is updated as necessary and stored in the irrotational image control data area 80. Then, the irrotational image 102 is displayed on the basis of the control data in the irrotational image control data area 80. As a consequence, the irrotational image 102 allowed movement independent of the rotation angle is displayed on the display screen.

In the step S17, the CPU 36 performs a requirement determination process. In the process of step S17, it is determined whether or not a predetermined requirement is satisfied in a relationship between a rotational image and an irrotational image. The progress of the game is changed according to a result of the determination. More specifically, one example of operation of a requirement determination process is presented in detail in each of FIG. 10, FIG. 11 and FIG. 12. For example, FIG. 10 shows one example of a requirement determination process during the game as shown in FIG. 5, FIG. 11 gives one example of a requirement determination process during the game as shown in FIG. 7, and FIG. 12 presents one example of a requirement determination process during the game as shown in FIG. 8.

Figure 10:
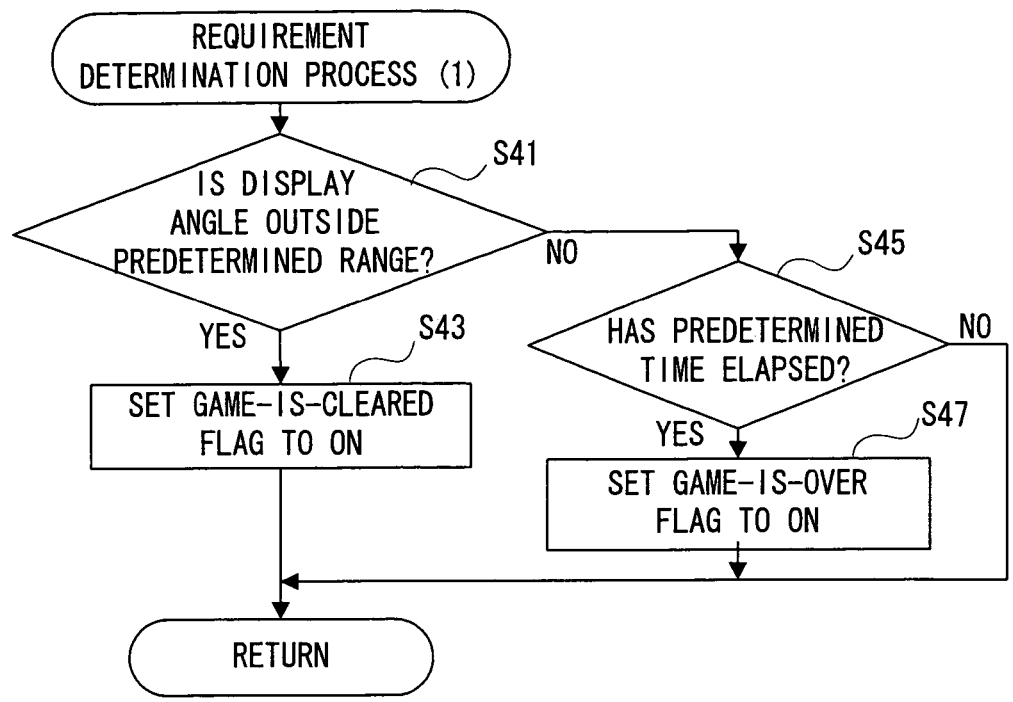
FIG. 10 is a flowchart showing one example of an operation of requirement determination process of FIG. 9 in a case where the game of FIG. 5

In the case where such a game as shown in FIG. 5 is selected in the step S3, a requirement determination process (1) described in FIG. 10 is performed in the step S17. In a first step S41 of FIG. 10, the CPU 36 determines whether or not the display angle of the rotational image 100 is outside a predetermined angle range. Alternatively, it may be determined whether or not the rotation angle of the game apparatus 10 is outside a predetermined angle range. This means that it is determined whether or not the game apparatus 10 is rotated in excess of a predetermined angle. In the case of the game of FIG. 5, for example, it is determined in the step S41 whether or not the display angle or rotation angle has reached an angle at which it is possible to let the rotational image 100 fall off the irrotational image 102. If "YES" in the step S41, the CPU 36 sets a game-is-clear flag to on in a step S43. Upon completion of the step S43, the process returns to the step S19 of FIG. 9.

On the other hand, if "NO" in the step S41, it is determined in a step S45 whether a predetermined time has elapsed or not. If "YES" in the step S45, that is, if the rotational image 100 remains on the irrotational image 102 even after a lapse of the predetermined time in the case of the game of FIG. 5, the CPU 36 sets the game-is-over flag to on in a step S47. Upon completion of the step S47, or if "NO" in the step S45, the process returns to the step S19 of FIG. 9.

Figure 11:
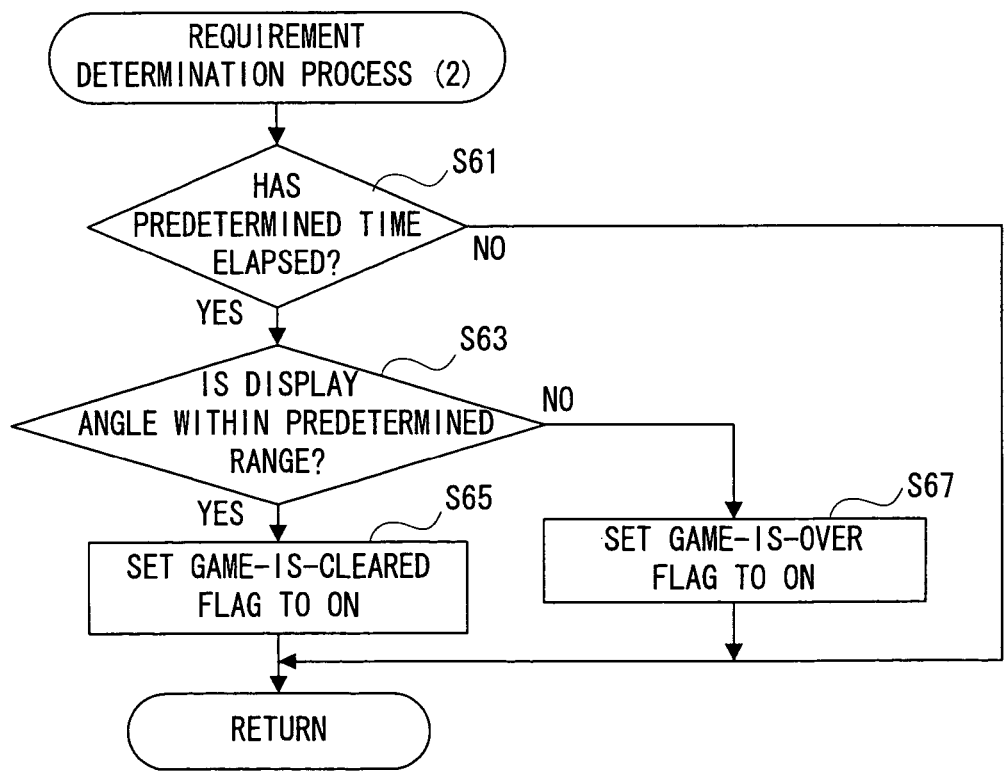
FIG. 11 is a flowchart showing one example of an operation of requirement determination process of FIG. 9 in a case where the game of FIG. 7 is performed.
Figure 12:
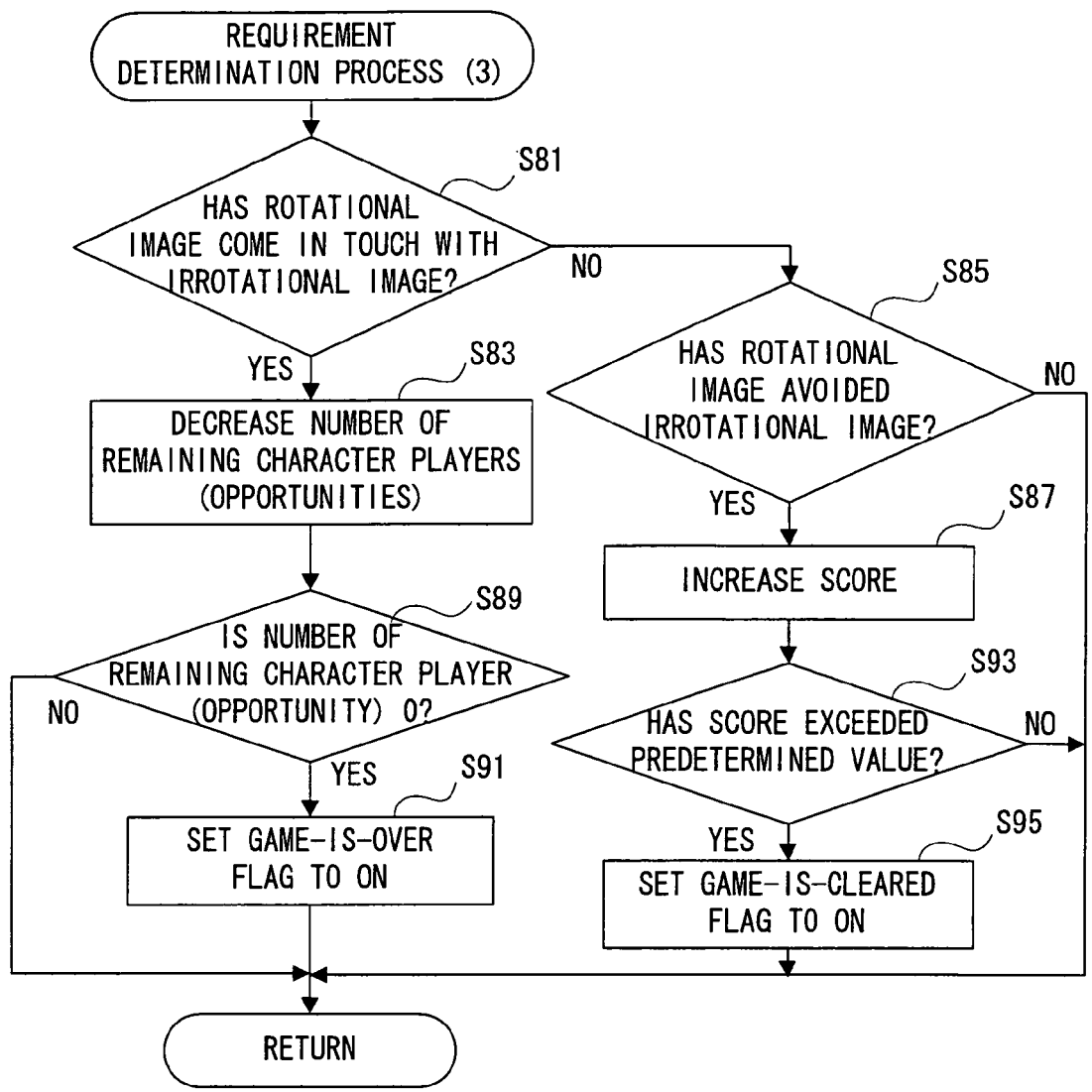
FIG. 12 is a flowchart showing one example of an operation of requirement determination process of FIG. 9 in a case where the game of FIG. 8 is performed.

Additionally, in the case where such a game as shown in FIG. 7 is selected in the step S3, a requirement determination process (2) described in FIG. 11 is performed in the step S17. In a first step S61 of FIG. 11, the CPU 36 determines whether a predetermined time has elapsed or not. That is, since the irrotational image 102 gradually approaches the rotational image 100 in the case of the game shown in FIG. 7, it is determined whether or not the timing of passing through the irrotational image 102 has been reached. If "NO" in the step S61, the process returns to the step S19 of FIG. 9.

On the contrary, if "YES" in the step S61, the CPU 36 determines in a step S63 whether or not the display angle of the rotational image 100 is within a predetermined angle range. As an alternative, it may be determined whether or not the rotation angle of the game apparatus 10 is within a predetermined angle range. In the case of the game of FIG. 7, for example, it is determined in the step S63 whether or not the rotational image 100 has reached a display angle at which it fits into the display area of the irrotational image 102 as shown in FIG. 7(B). If "YES" in the step S63, the CPU 36 sets the game-is-cleared flag to on in a step S65. On the other hand, if "NO" in the step S63, the CPU 36 sets the game-is-over flag to on in a step S67. Upon completion of the step S65 or step S67, the process returns to the step S19 of FIG. 9.

Besides, in the case where such a game as shown in FIG. 8 is selected in the step S3, a requirement determination process (3) described in FIG. 12 is performed in the step S17. In a first step S81 of FIG. 12, the CPU 36 determines whether or not the rotational image 100 has come in contact with the irrotational image 102, based on the display position of the rotational image 100 and the display position of the irrotational image 102, for example. If there exist a plurality of irrotational images 102 in the display area, this contact determination is performed on all the irrotational images 102. If "YES" in the step S81, the CPU 36 decreases in a step S83 the value of the score for the player, the life of the player character 100 or the number of remaining player characters (remaining opportunities) or the like, which is stored in a predetermined location of the data storage area.

On the contrary, if "NO" in the step S81, the CPU 36 determines in a step S85 whether or not the rotational image 100 has succeeded in avoiding the irrotational image 102. If "YES" in the step S85, the CPU 36 increases the value of the score or the like stored in the predetermined location of the data storage area in a step S87.

After completion of the step S83, the CPU 36 determines in a step S89 whether or not the value of life, remaining player characters or the like has reached zero. If "YES" in the step S89, the CPU 36 sets the game-is-over flag to on in a step S91. On the other hand, if "NO" in the step S89, the process returns to the step S19 of FIG. 9. Also, if "NO" in the step S85, the process returns to the step S19 of FIG. 9.

In addition, after the end of the step S87, the CPU 36 determines in a step S93 whether or not the score has exceeded a predetermined value. If "YES", the CPU 36 turns the game-is-clear flag on in a step S95. Upon completion of the step S91 or step S95, or if "NO" in the step S93, the process returns to the step S19 of FIG. 9.

Returning to FIG. 9, the CPU 36 determines in the step S19 whether the game is over or not. If "YES" in the step S19, that is, if the game-is-over flag is set to on, the CPU 36 executes a game-is-over process in a step S23 to terminate the process of this game stage.

Then, the CPU 36 determines in a step S25 whether or not to end the game playing. For example, the CPU 36 displays a screen for confirming the end of the game playing to prompt the player to select the end or continuation of the game playing by manipulating the operating switch 20. If "NO" in the step S25, that is, if the operational data in the operational data buffer area 76 specifies the continuation of the game playing, the process returns to the step S1. On the other hand, if "YES" in the step S25, that is, if the operational data specifies the end of the game playing, for example, the process of this game is terminated.

On the contrary, if "NO" in the step S19, the CPU 36 determines in the step S21 whether the game is cleared or not. If "NO" in the step S21, the process returns to the step S5. On the other hand, if "YES" in the step S21, that is, if the game-is-cleared flag is set to on, the CPU 36 executes a game-is-cleared process in a step S27 to end the process of this game stage. Upon end of the step S27, the process returns to the step S3.

Besides, descriptions have been given heretofore as to the determination of whether the game is cleared or the game is over, based on a relationship in display between the rotational image 100 and the irrotational image 102. The progress of a game based on a relationship in display between the rotational image 100 and the irrotational image 102 is not limited to the above described one.

For example, instead of making the determination that the game is cleared, it is conceivable to set to on a flag for providing a specific game playing opportunity. Also, instead of making the determination that the game is over, it is possible to set to on a flag for providing another specific game playing opportunity. This makes it possible to offer a more interesting game with further complicated requirements for its progress.

In addition, it is possible to raise the difficulty level of a game depending on the number of successfully cleared games and the number of unsuccessfully finished games. According to this embodiment, in the case of the game shown in FIG. 10 or FIG. 11, it is possible to increase its difficulty level by shortening the length of the predetermined time, as an example.

This embodiment provides the player with an all-new way of enjoying a game in which the game is progressed by rotating the rotational image 100 through a rotating operation for rotating the game apparatus 10 around an axis perpendicular to the display screen. Moreover, since the rotating operation is around an axis perpendicular to the display screen, the display screen is not inclined and remains in the state at a start of the game in which it is right opposite to the player. As a consequence, performing a game operation by moving the game apparatus 10 itself will never make a game image hard to see. This allows the player to enjoy playing the game to the full. Additionally, since the game proceeds according to a relationship between the rotational image 100 rotating with reference to the rotation angle of the game apparatus 10 and the irrotational image 102 controlled independently of the rotation angle of the same, the player can enjoy a new sense of game with highly entertaining characteristics. Furthermore, if the rotational image 100 is rotated by the same degree of angle as the rotation angle of the game apparatus 10 and in a direction opposite to the rotation angle of the game apparatus 10, it is possible to offer the player a game image in which it appears that the rotational image 100 remains at a standstill and the irrotational image 102 makes a rotational movement. This allows the player to experience a new, amusing sense of game playing with enjoyment.

Although present non-limiting, exemplary embodiments has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus equipped with a housing of a size capable of being held by a player with hands and a display including a display screen provided in said housing, comprising:
    an angular velocity detector provided in relation to said housing for detecting an angular velocity of a rotation of said housing around an axis perpendicular to said display screen;
    a rotation angle calculator for calculating a rotation angle of said housing based on the angular velocity detected by said angular velocity detector;
    a first image data storage area for storing first image data by which on said display at least one first image is displayed, said first image capable of being rotated according to said rotation angle;
    a second image data storage area for storing second image data by which on said display at least one second image which is irrotational with respect to said rotation angle is displayed;
    a first image display controller for controlling display of said first image being displayed on said display screen such that said first image is rotated around said axis perpendicular to said display screen in a direction opposite to a direction of said rotation of said housing by an amount corresponding to said rotation angle calculated by said rotation angle calculator so that the first image appears to remain at a standstill;
    a second image display controller for controlling display of said second image so that the second image remains irrotational with said rotation angle of the housing so that the second image appears to make a rotation movement in a same direction to the direction of the rotation of the housing in an amount corresponding to the rotation angle calculated by said rotation angle calculator;
    a determination programmed logic circuitry for determining whether or not at least one of the display angle and a display position of said first image satisfies a requirement defined by a relationship with said second image; and
    a game progress change programmed logic circuitry for making a change in a progress of a game according to a result of the determination by said determination programmed logic circuitry.

2. A game apparatus according to claim 1, wherein said angular velocity detector includes a vibration gyro.

3. A storage medium storing a game program for realizing a function of a game apparatus comprising a housing of a size capable of being held by a player with hands, a display including a display screen provided in said housing, an angular velocity detector provided in relation to the housing for detecting an angular velocity of a rotation of the housing around an axis perpendicular to said display screen; a first image data storage area for storing first image data by which on said display at least one first image is displayed, said first image being capable of being rotated according to a rotation angle of said housing; and a second image data storage area for storing second image data by which on said display at least one second image which is irrotational with respect to the rotation angle of said housing is displayed, the game apparatus on which a game is played by performing a rotating operation on said housing, wherein said game program causes a processor of said game apparatus to execute:

calculating the rotation angle of said housing on the basis of the angular velocity detected by said angular velocity detector;

controlling display of said first image being displayed on the display screen such that the first image is rotated around the axis perpendicular to the display screen in a direction opposite to a direction of the rotation of the housing by an amount corresponding to said calculated rotation angle of the housing;

controlling display of said second image so that the second image remains irrotational with said rotation angle of the housing so that the second image appears to make a rotation movement in a same direction to the direction of the rotation of the housing in an amount corresponding to the rotation angle of the housing;

determining whether or not at least one of a display angle and a display position of said first image satisfies a requirement defined by a relationship with display of said second image; and making a change in a progress of the game according to a result of the determination in said determination step.

4. A game control method for a game apparatus comprising a housing of a size capable of being held by a player with hands, a display including a display screen provided in said housing, an angular velocity detector provided in relation to the housing for detecting an angular velocity of a rotation of the housing around an axis perpendicular to said display screen, a first image data storage area for storing first image data by which on said display at least one first image is displayed, said first image being capable of being rotated according to a rotation angle of said housing, and a second image data storage area for storing second image data by which on said display at least one second image which is irrotational with respect to the rotation angle of said housing is displayed, the method including:

calculating the rotation angle of said housing on the basis of the angular velocity detected by said angular velocity detector;

controlling display of said first image being displayed on the display screen such that the first image is rotated around the axis perpendicular to the display screen in a direction opposite to a direction of the rotation of the housing by an amount corresponding to said calculated rotation angle of the housing;

controlling display of said second image so that the second image remains irrotational with said rotation angle of the housing so that the second image appears to make a rotation movement in a same direction to the direction of the rotation of the housing in an amount corresponding to the calculated rotation an angle of the housing;

determining whether or not at least one of the display angle and a display position of said first image satisfies a requirement defined by a relationship with display of said second image; and making a change in a progress of a game according to a result of the determination in said determination step.

* * * * *